United States Patent
Chen

(10) Patent No.: US 8,382,215 B2
(45) Date of Patent: Feb. 26, 2013

(54) COMPUTER ENCLOSURE

(75) Inventor: Yun-Lung Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 264 days.

(21) Appl. No.: 12/904,378

(22) Filed: Oct. 14, 2010

(65) Prior Publication Data

US 2011/0285259 A1 Nov. 24, 2011

(30) Foreign Application Priority Data

May 20, 2010 (CN) .......................... 2010 1 0178783

(51) Int. Cl.
*A47B 81/00* (2006.01)
(52) U.S. Cl. .................................................. 312/223.2
(58) Field of Classification Search .... 312/223.1–223.2; 361/740, 747, 726, 759
See application file for complete search history.

(56) References Cited

U.S. PATENT DOCUMENTS

| | | | | | |
|---|---|---|---|---|---|
| 5,967,466 | A | * | 10/1999 | Osborne et al. | 248/27.1 |
| 6,138,839 | A | * | 10/2000 | Cranston et al. | 211/41.17 |
| 6,231,139 | B1 | * | 5/2001 | Chen | 312/223.2 |
| 6,357,603 | B1 | * | 3/2002 | Dingman | 211/41.17 |
| 6,552,913 | B2 | * | 4/2003 | Tournadre | 361/759 |
| 6,704,205 | B1 | * | 3/2004 | Chen | 361/740 |
| 7,855,898 | B2 | * | 12/2010 | Tang | 361/801 |
| 8,072,767 | B2 | * | 12/2011 | Xue | 361/755 |
| 8,144,455 | B2 | * | 3/2012 | Chen | 361/679.32 |
| 2007/0177267 | A1 | * | 8/2007 | Chen et al. | 359/514 |
| 2007/0177341 | A1 | * | 8/2007 | Chen et al. | 361/683 |

* cited by examiner

Primary Examiner — Hanh V Tran
(74) Attorney, Agent, or Firm — Altis Law Group, Inc.

(57) ABSTRACT

A computer enclosure includes a computer panel, an expansion card shield, and a retaining member. The computer panel defines a slot and has a support piece located above the slot. The expansion card shield includes a main piece covering the slot and a resisting piece abutting on the support piece of the computer panel. The retaining member is pivotably attached to the computer panel and includes a main portion and a clasping portion connected to the main portion. The retaining member is capable of rotating to a closed position where the main portion resists against the expansion card shield and the clasping portion is secured to the computer panel, or rotating to an open position where the main portion is disengaged from the expansion card shield and the clasping portion is disengaged from the computer panel.

6 Claims, 4 Drawing Sheets

COMPUTER ENCLOSURE

BACKGROUND

1. Technical Field

The present disclosure relates to computer enclosures, and more particularly to a computer enclosure in which expansion cards can be conveniently mounted.

2. Description of Related Art

Microprocessor based computer systems typically require or include facilities for connecting one or more expansion cards to the system. Expansion cards extend the capabilities of computer systems by providing dedicated hardware to achieve a variety of tasks.

Maintaining precise positioning of expansion cards is an important issue in the design and manufacturing of computer systems. Historically, the secure positioning of expansion cards has been maintained by screwing each expansion card into place with one or more securing screws. Unfortunately, the use of multiple screws to secure each expansion card undesirably increases the amount of time and effort required to install, remove, replace, and otherwise service the expansion cards in a system.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
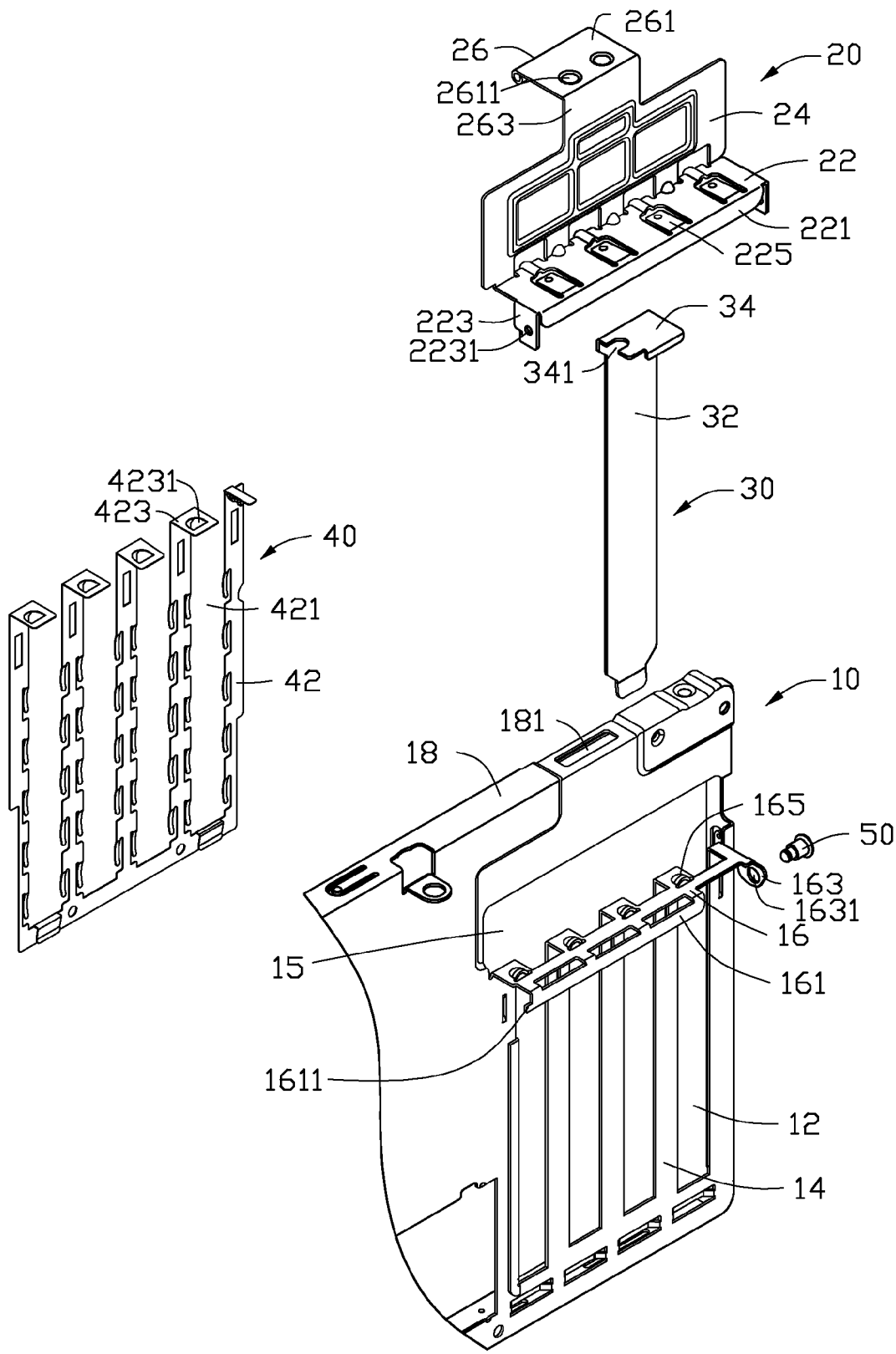
FIG. 1 is an exploded partial view of a computer enclosure according to an embodiment.
Figure 2:
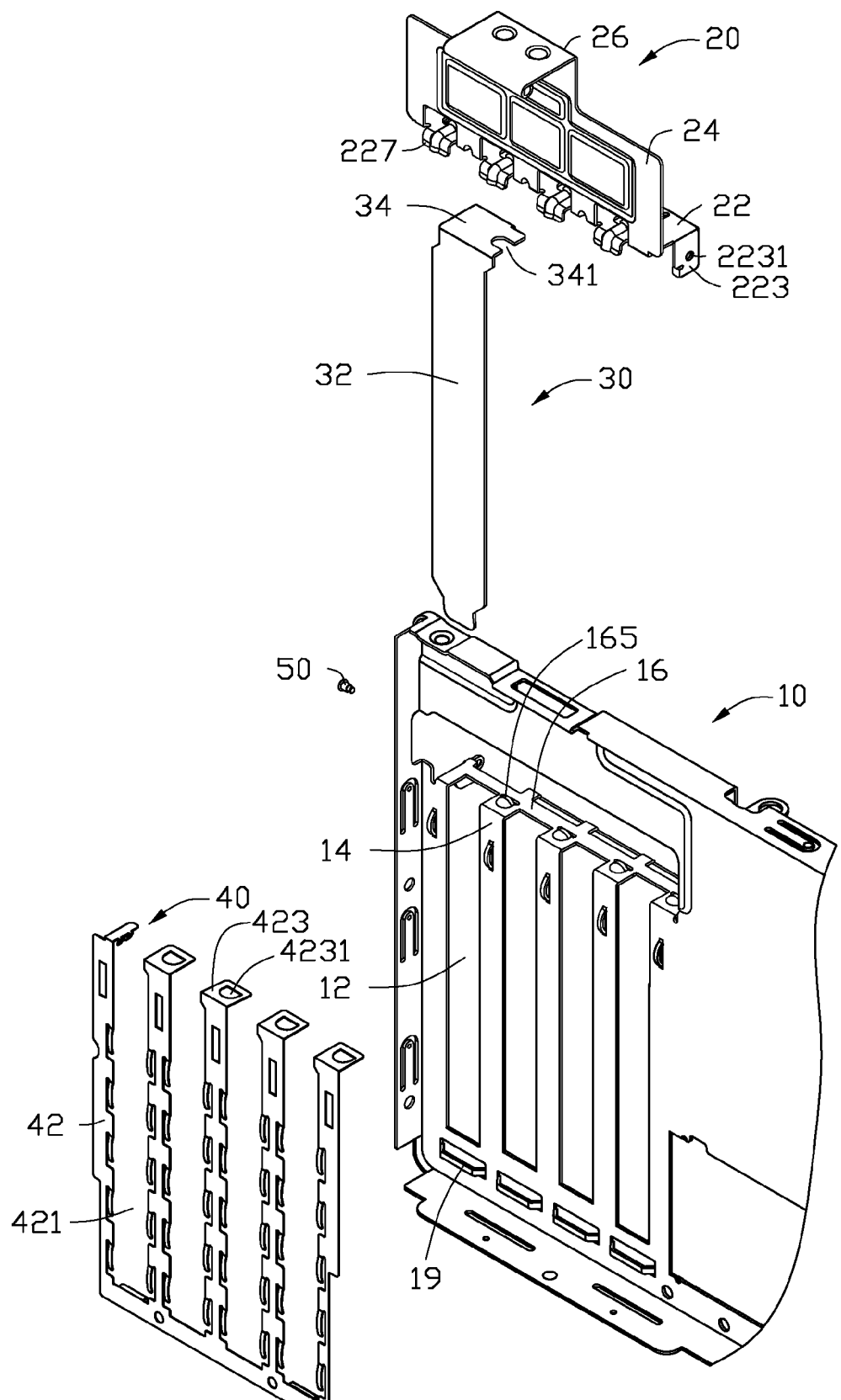
FIG. 2 is similar to FIG. 1, but viewed from another aspect.

Referring to FIGS. 1 and 2, an embodiment of a computer enclosure includes a computer panel 10, a retaining member 20, an expansion card shield 30 to which an expansion card (not shown) can be secured thereto, an Electro Magnetic Interference (EMI) shielding member 40, and a fastener 50.

The computer panel 10 includes a rear plate 14. A plurality of lengthways slots 12 and an opening 15 are defined in the rear plate 14. The slots 12 are configured for the mounting of shield plates of expansion cards. The opening 15 is located above the slots 12. A support piece 16 is bent perpendicularly and outwards from the rear plate 14 at a top of the slots 12. A plurality of protrusions 165 is formed at an upper surface of the support piece 16. A flange 161 is bent downwardly from the support piece 16. A protruding tab 1611 is formed at a distal end of the flange 161. A mounting piece 163 is bent downwardly and perpendicularly from a side edge of the support piece 16. A pivoting hole 1631 is defined in the mounting piece 163. A top flange 18 is extended perpendicularly and inwards from a top edge of the rear plate 14. A rectangular-shaped groove 181 is defined in the top flange 18. A holding hook 19 below each of the slots 12 protrudes from an inner side of the rear plate 14 (see FIG. 2).

The retaining member 20 includes a bottom plate 22, a side plate 24 and a clasping portion 26 extending from a central top edge of the side plate 24. The bottom plate 22 and the side plate 24 form the main portion of the retaining member 20 that is L-shaped. The clasping portion 26 has an inverted L-shape. A bottom flange 221 is bent perpendicularly from a lengthways edge of the bottom plate 22. A pair of mounting pieces 223 is bent downwards and perpendicularly from opposite sides of the bottom plate 22. A pivot hole 2231 is defined in each of the mounting pieces 223. A plurality of resilient resisting pieces 225 is formed in the bottom plate 22. A plurality of hooks 227 is bent downwardly from a conjunction portion of the bottom plate 22 and the side plate 24 (see FIG. 2). The clasping portion 26 of the retaining member 20 includes an extending piece 263 extending upwardly from the side plate 24 and an operation piece 261 extending perpendicularly from a top edge of the extending piece 263. A pair of bulges 2611 protrude downwardly from the operation piece 261 for engaging in the groove 181 of the computer panel 10.

The expansion card shield 30 includes a lengthways piece 32 and a resisting tab 34 bent perpendicularly from a top edge of the lengthways piece 32. A gap 341 is defined in the resisting tab 34 corresponding to the protrusion 165 of the computer panel 10.

The EMI shielding member 40 includes a main body 42 and a plurality of bent flanges 423 extending perpendicularly from the main body 42. A plurality of parallel slots 421 are defined in the main body 42. A mounting opening 4231 is defined in each of the bent flanges 423 corresponding to the protrusion 165 of the computer panel 10.

Figure 3:
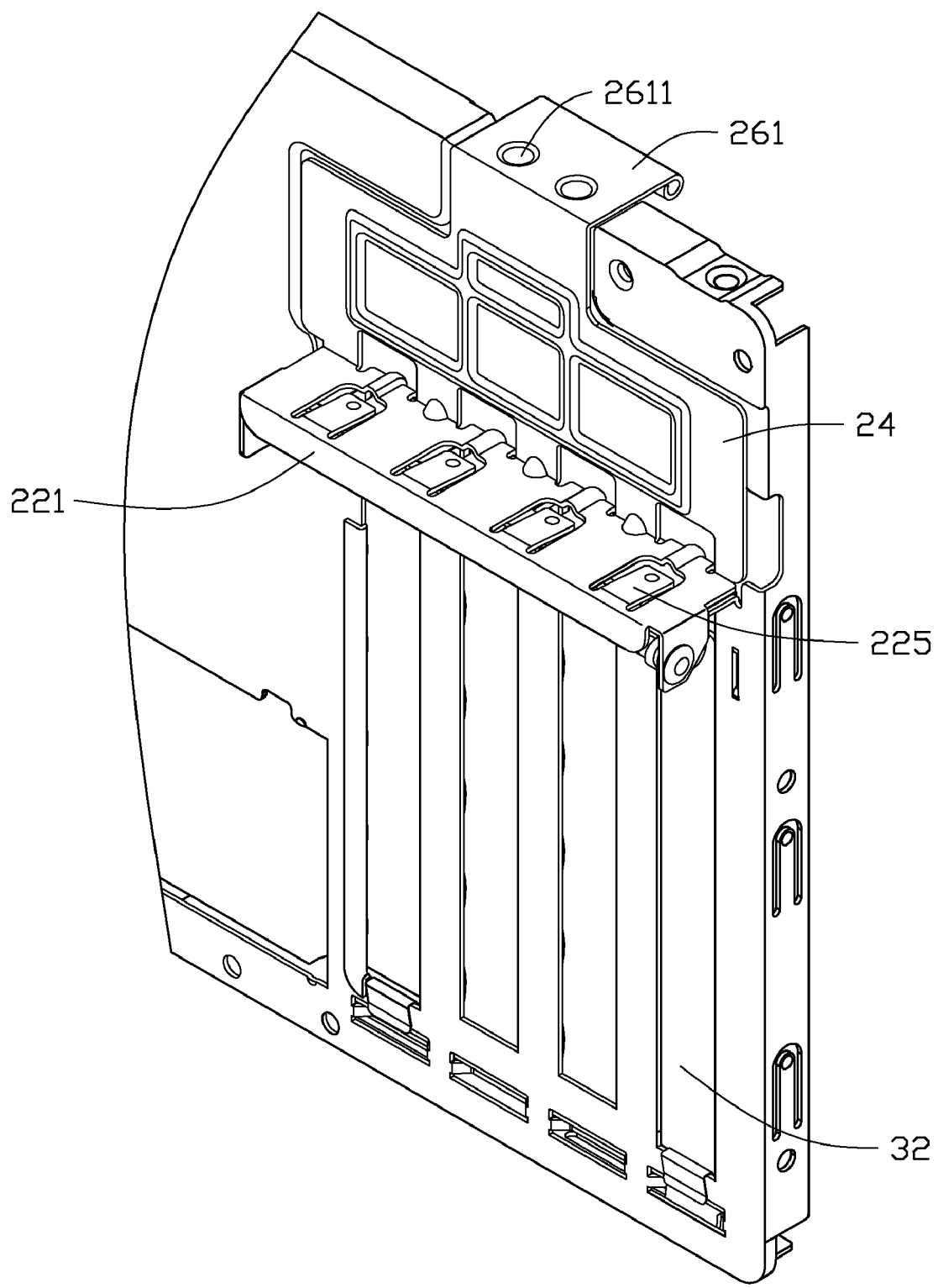
FIG. 3 is an assembled view of FIG. 1, but viewed from another aspect.
Figure 4:
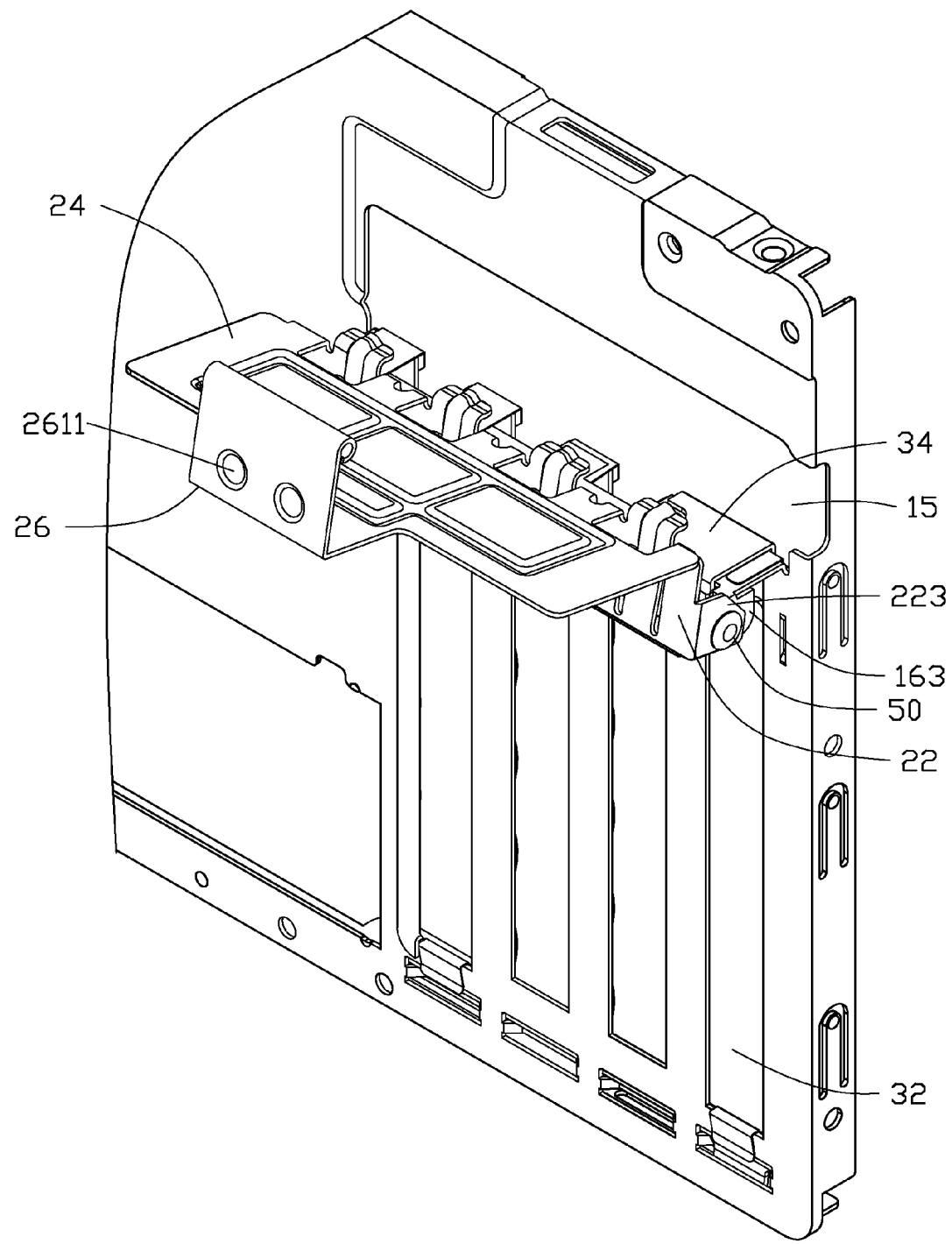
FIG. 4 is similar to FIG. 3, but showing a retaining member rotated to disengage from a shield plate.

Referring to FIGS. 3 and 4, in assembly, the EMI shielding member 40 is attached to the inner side of the computer panel 10. The protrusions 165 of the computer panel 10 are inserted into the mounting openings 4231 of the EMI shielding member 40. The slots 421 of the EMI shielding member 40 are aligned with the slots 12 of the computer panel 10. A bottom end of the expansion card shield 30 is engaged in a corresponding one of the holding hooks 19 of the computer panel 10. The lengthways piece 32 of the expansion card shield 30 covers one of the slots 12 correspondingly. The resisting tab 34 of the expansion card shield 30 abuts the support piece 16 of the computer panel 10. One corresponding protrusion 165 formed on the support piece 16 is engaged in the gap 341 of the expansion card shield 30. The protruding tab 1611 is pivotably engaged in one of the pivot holes 2231 of the retaining member 20. The pivoting hole 1631 of the mounting piece 163 of the computer panel 10 is aligned with the other one of the pivot holes 2231 of the retaining member 20. The fastener 50 is engaged in the pivot hole 2231 of the retaining member 20 and the pivoting hole 1631 of the computer panel 10, for pivotably attaching the retaining member 20 to the computer panel 10.

To lock the expansion card shield 30, the retaining member 20 is rotated to a closed position where the resilient resisting piece 225 of the retaining member 20 abuts the resisting tab 34 of the expansion card shield 30, the hook 227 of the retaining member 20 abuts an upper portion of the expansion card shield 30, the side plate 24 of the retaining member 20 covers the opening 15 of the computer panel 10, and the bulges 2611 of the retaining member 20 are engaged in the groove 181. Then, the expansion card shield 30 is secured to the computer panel 10, and the expansion card (not shown), attached to the expansion card shield 30, is secured in the computer enclosure.

To release the expansion card shield 30, the operation piece 261 of the retaining member 20 is pulled upwardly to disengage the bulges 2611 of the retaining member 20 from the groove 181 of the computer panel 10. The operation the retaining member 20 is rotated to an open position (see FIG. 4) where the side plate 24 of the retaining member 20 is disengaged from the expansion card shield 30. Then the expansion card shield 30, and the expansion card secured thereto, can move upwards to be detached from the computer panel 10.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer enclosure comprising:
    a computer panel with a slot defined therein and a support piece extending from the computer panel, the support piece is located above the slot; and the computer panel comprising a top flange extending perpendicularly therefrom, and a groove defined in the top flange;
    an expansion card shield comprising a main piece covering the slot and a resisting tab abutting the support piece; and
    a retaining member, pivotably attached to the computer panel, comprising a main portion and a clasping portion connecting to the main portion;
    the main portion comprises a bottom plate and a side plate perpendicularly extending from the bottom plate, the retaining member is pivotably attached to the computer panel via the bottom plate;
    the clasping portion comprises an extending piece and an operation piece extending perpendicularly from the extending piece, the extending piece is in the same plane with the side plate of the main portion, the operation piece is perpendicular to the side plate and parallel with the bottom plate, at least one bulge located on and protruding downwardly from the operation piece;
    wherein the retaining member is capable of rotating between a closed position, where the bottom plate abuts on the supporting piece, the side plate abuts on the computer panel, the operation piece is biased and abuts on the top flange of the computer panel, the at least one bulge located in the groove therein, thereby securing the expansion card shield, and an open position where the at least one bulge is disengaged from the groove, thereby disengaging the expansion card shield;
    wherein the computer panel comprises a flange extending from the support piece and a tab protruding from one end of the flange, a first pivot hole and a second pivot hole are defined in the retaining member, and the tab is pivotably engaged in the first pivot hole, a mounting piece extended downwards from a side edge of the support piece, a circular hole is defined in the mounting piece and aligned with the second pivot hole, and a fastener is engaged into the second pivot hole and the circular hole, thereby pivotably attaching the retaining member to the computer panel.

2. The computer enclosure of claim 1, wherein said mounting piece comprises a pair of mounting pieces perpendicularly extending from opposite sides of the bottom plate, and the pair of pivot holes is respectively defined in the pair of mounting pieces.

3. The computer enclosure of claim 1, wherein the retaining member further comprises at least one resilient resisting piece located on the bottom plate, the at least one resilient resisting piece abuts the expansion card shield in the closed position.

4. The computer enclosure of claim 1, wherein the retaining member further comprises at least one hook extending from the bottom plate, the expansion card shield is held by the at least one hook when the retaining member is at the closed position.

5. The computer enclosure of claim 1, wherein the computer panel has at least one holding hook located below the slot, a bottom end of the expansion card shield is engaged with the at least one holding hook.

6. The computer enclosure of claim 1, wherein the main portion is L-shaped, and the clasping portion is inverted L-shaped.

* * * * *